March 3, 1931.   S. H. GRAVES   1,794,893
EXPANSION APPARATUS FOR TRANSFORMERS
Filed Nov. 1, 1924
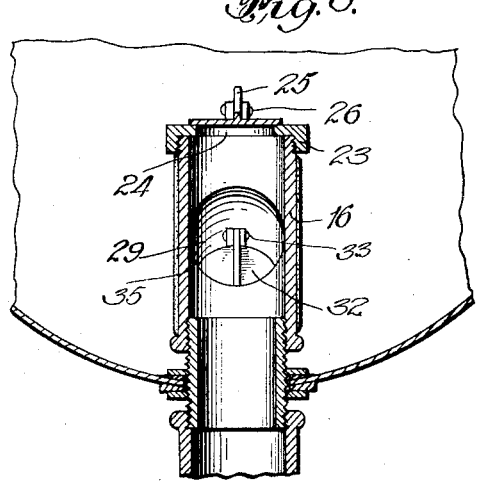
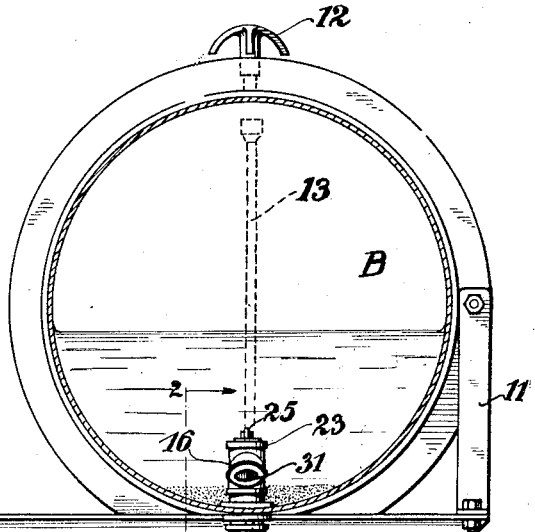
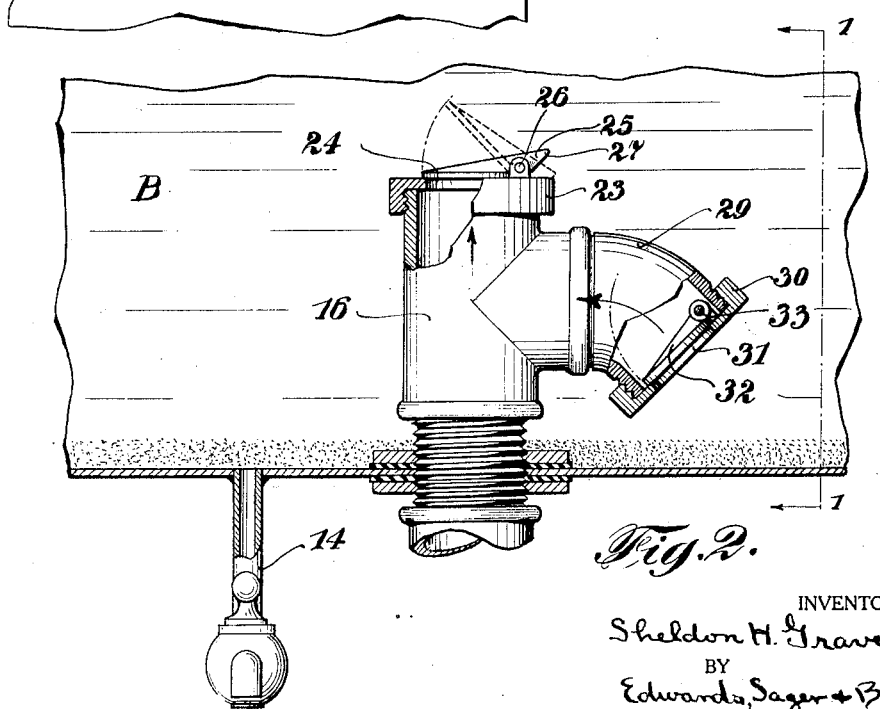
INVENTOR
Sheldon H. Graves
BY
Edwards, Sager & Bower
ATTORNEY Patented Mar. 3, 1931

1,794,893

UNITED STATES PATENT OFFICE

SHELDON H. GRAVES, OF NEW YORK, N. Y., ASSIGNOR, BY MESNE ASSIGNMENTS, TO ALLIS-CHALMERS MANUFACTURING COMPANY, A CORPORATION OF DELAWARE

EXPANSION APPARATUS FOR TRANSFORMERS

Application filed November 1, 1924. Serial No. 747,279.

This invention relates to electrical devices such as transformers, reactors and the like which are adapted to be immersed in oil contained in a tank. More particularly it relates to apparatus of this character which embody auxiliary oil expansion tanks which are connected to and adapted to receive over-flow oil from the main transformer tank.

It is the practice to mount the expansion tank at or above the top of the main tank and to connect the two tanks by a passage which leads from the lower part of the expansion tank to the upper part of the main tank. When the body of oil expands on heating, oil flows through this passage from the main tank into the expansion tank and upon contraction of the oil on cooling, the oil flows from the expansion tank to the main tank. In cold weather, the oil outside of the main tank tends to become thick or congealed and this interferes with the proper flow of oil between the tanks. In warm weather when the temperature of the oil is sufficient to permit ready flow between the tanks, the heated oil in the transformer tank rises through the passage connecting the tanks and thence to the surface of the oil contained in the expansion tank where it comes into contact with the air in the expansion tank. Due to its heated condition, this oil is oxidized by the air with the result that the oil sludges which interferes with the proper functioning of the apparatus.

By the use of the present invention, I am able to avoid the objectionable features above described. For this purpose, I provide a passage between the main and expansion tanks of sufficient diameter to insure a free flow of oil therethrough even though it is thickened or in a partly congealed condition. I also provide means which normally closes communication between this passage and the body of oil in the expansion tank, but which operates on the rise or fall of pressure in the transformer tank to open communication between the passage and the oil in the expansion tank, so that in the event of the expansion or contraction of the oil in the transformer tank, there is a free interchange of oil between the tanks.

Other objects and advantages of my invention will appear from the following description taken in connection with the accompanying drawing which shows the preferred embodiment of my invention and wherein Figure 1 is a fragmentary view, partly in section, showing a transformer tank, an expansion tank, and the communicating means between the two tanks, Figure 2 is a fragmentary view of a portion of the interior of the expansion tank, showing the pressure operated valves which serve to open communication between the tanks and Fig. 3 is a fragmentary transfer section through the expansion tank and communicating pipe showing a slightly modified form of my invention.

In the drawing, A represents a main tank adapted to contain a transformer (not shown) and oil, and B represents an expansion tank adapted to receive over-flow oil from the tank A. The tank A is filled with oil and the tank B partly filled. The tank B, as shown is supported from the top of the main tank by bars 10 to which it may be secured by any suitable means, such as straps 11. The expansion tank is provided with the usual breather 12, oil gauge 13 and pipe and pet cock 14 adapted to drain moisture and sediment from the extreme bottom of the expansion tank. Leading from the top of the transformer tank A and through the bottom of the tank B is a pipe 15 which terminates in a T connection 16. Screw threaded to the top of the T connection 16 is a cap 23 formed with a central opening 24. The opening 24 is adapted to be closed by means of a valve 25, which is pivoted at 26 to the cap 23. In practice the valve 25 is normally closed by gravity and a stop 27 is provided to limit the extent to which the valve 25 may open and to insure the closing of the valve when pressure beneath the valve is relieved. Threaded to the side limb of T connection 16 is an elbow 29 which carries at its outer end a cap 30 formed with a central opening 31 which is normally closed by a valve 32 which is pivoted at 33 on the inside of the cap.

In the normal operation the valves 25 and 32 are closed. While the heated oil from the tank A rises in the pipe 15, it is prevented from rising to the surface of the oil in the expansion tank by the valves 25 and 32 and the body of oil remains sufficiently cool to prevent oxidation. In case it is desired to lessen the conduction of heat from the heated oil through the T connection 16 and its connected parts, this connection and parts may be formed of enamelled metal or otherwise coated or lined with heat insulating material, as is shown at 35 in Fig. 3.

When the oil in the tank A contracts on cooling, the valve 32 opens and permits oil to enter from the expansion tank. The opening 31 and passages leading to the transformer tank should be sufficiently large to permit the ready flow of cool oil therethrough. Cool oil entering through opening 31 becomes heated by mixing with the heated oil in the elbow 29 and connected passages and in this manner the flow back to the transformer tank is facilitated.

On expansion of the oil in the transformer tank on heating, valve 25 opens and permits the oil to flow from the transformer tank into the body of oil in the expansion tank. The opening 24 is sufficiently large to provide a quick vent in case of a sudden increase in pressure in the transformer tank as may be caused by arcing at the transformer. Such arcing results in a decomposition of the oil and the rapid generation of large quantities of gases. If no means is provided for the free venting of these gases, a very high hydro-static pressure is developed in the transformer tank which is transmitted through the oil to the walls of the tank and results in serious injury to the tank, particularly if the transformer tank is formed of thin sheet metal. By the use of my invention herein disclosed, on a sudden rise of pressure in the transformer tank, a wide passage is opened between the transformer and expansion tanks. The highly heated gases which are generated find a ready exit through this passage and by coming in contact with the cool body of oil in the expansion tank are themselves sufficiently cooled so that they will not ignite and explode on contact with the air in the expansion tank.

While I have described and illustrated one embodiment of my invention, it will be understood that various modifications may be employed without departing from the spirit of the invention. Thus the elbow 29 may in certain cases turn upwardly instead of downwardly in which case the valve 32 would be held normally closed by means of a spring.

The tank A may, if desired, be provided with radiators for the purpose of cooling the oil in the tank.

I claim:

1. A transformer tank, an oil expansion tank, a pipe structure forming a main passage of large diameter extending from the top of said transformer tank through the bottom wall of said expansion tank, and valve means normally closing the upper end of said passage and operating under large increase in pressure in said passage to form a freely open vent passage at the upper end of said passage, said pipe structure being formed with a separate branch passage for admission of oil from said expansion tank to said main passage and having a valve automatically opening upon decrease in pressure in said main passage, said branch passage communicating with said main passage at the side thereof and opening downwardly into the body of oil in said expansion tank.

2. A transformer tank, an oil expansion tank, a pipe structure forming a main passage of large diameter extending from the top of said transformer tank through the bottom wall of said expansion tank, valve means normally closing the upper end of said passage and operating under large increase in pressure in said passage to form a freely open vent passage at the upper end of said passage, said pipe structure being formed with a separate branch passage for admission of oil from said expansion tank to said main passage, said branch passage communicating with said main passage at the side thereof and opening downwardly into the body of oil in said expansion tank, and a gravity closed valve in the lower end of said branch passage.

3. A transformer tank, an expansion tank, a pipe extending from said transformer tank into said expansion tank, oil extending from said transformer tank through said pipe into said expansion tank, means for preventing the free thermal circulation of oil from said pipe into said expansion tank but permitting thermal circulation within said pipe from and to said transformer tank, and means for heat-insulating the portion of said pipe which extends into said expansion tank.

4. A transformer tank, an expansion tank, a pipe extending from said transformer tank into said expansion tank, oil extending from said transformer tank through said pipe into said expansion tank, valve means for preventing the free thermal circulation of oil from said pipe into said expansion tank but permitting thermal circulation within said pipe from and to said transformer tank, said valve means being openable in response to predetermined pressure of the oil in the said transformer tank, and means for heat-insulating the portion of said pipe which extends into said expansion tank.

SHELDON H. GRAVES.